United States Patent

[11] 3,585,459

| [72] | Inventors | Reginald G. Hills<br>North Adams, Mass.;<br>Robert W. Santway, Bennington, Vt. |
|---|---|---|
| [21] | Appl. No. | 863,136 |
| [22] | Filed | Oct. 2, 1969 |
| [45] | Patented | June 15, 1971 |
| [73] | Assignee | Spraque Electric Company<br>North Adams, Mass. |

[54] CAPACITOR WITH ELECTROLYTE COMPRISING BORIC ACID AND PENTANEDIOL
14 Claims, 1 Drawing Fig.

[52] U.S. Cl................................................. 317/230, 252/62.2
[51] Int. Cl................................................. H01g 9/00
[50] Field of Search............................................ 317/230, 231, 233; 252/62.2

[56] References Cited
UNITED STATES PATENTS

| 2,945,164 | 7/1960 | Taylor........................ | 317/230 |
| 2,934,681 | 4/1960 | Ross............................ | 317/230 |
| 3,325,697 | 6/1967 | Ross............................ | 317/230 |
| 3,403,304 | 9/1968 | Ross et al.................... | 317/230 |
| 3,403,305 | 9/1968 | Santway et al.............. | 317/230 |

*Primary Examiner*—James D. Kallam
*Attorneys*—Connolly and Hutz, Vincent H. Sweeney, James Paul O'Sullivan and David R. Thornton

ABSTRACT: An electrolytic capacitor has a capacitor section having a plurality of electrodes, at least one electrode of which is a valve metal having on its surface an insulating oxide layer, said section being impregnated with an electrolyte. The electrolyte comprises a solvent and an ionogen of a mixture of boric acid and a pentanediol, wherein the mol ratio of boric acid to said pentanediol is between about 0.2-2.

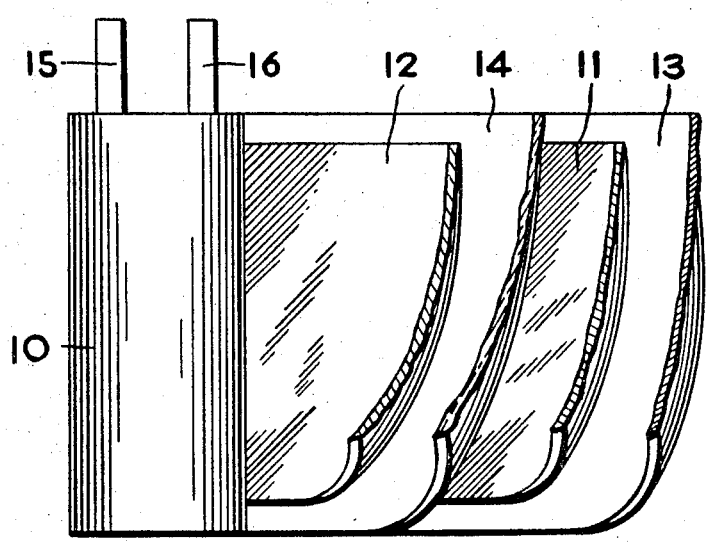

CAPACITOR WITH ELECTROLYTE COMPRISING BORIC ACID AND PENTANEDIOL

BACKGROUND OF THE INVENTION

The invention is concerned with an electrolytic capacitor and more particularly with a new electrolyte for such a capacitor.

U.S. Pat. No. 3,403,304 issued to Sidney D. Ross et al., Sept. 24, 1968, teaches the use of certain new quaternary ammonium diorgano-boron compounds of high purity as the solute in an electrolyte for an electrolytic capacitor. U.S. Pat. No. 3,403,305 issued to R. W. Santway et al., is concerned with the use of a related group of diorgano-boron compounds as the solute in an electrolyte for an electrolytic capacitor. These compounds while affording particularly attractive characteristics to electrolytic capacitors are designed more for low voltage applications. It would be a significant advance in the art of electrolytic capacitors to present the art with an electrolyte which would permit the maximum use of higher voltage oxide layers and also to present the art with an electrolyte having a fairly stable resistivity.

It is therefore an object of the present invention to present an electrolyte system capable of withstanding exceptionally high voltages without scintillation.

It is a further object of the invention to provide a capacitor electrolyte which is comparatively stable over the life of the capacitor.

Other objects and advantages of the present invention will be made obvious to those skilled in the art by the following description when considered in relation to the appended drawing in which the sole FIGURE represents a partially wound capacitor section of the present invention.

SUMMARY OF THE INVENTION

The present invention is concerned with a electrolytic capacitor employing a capacitance section having a plurality of electrodes, at least one of which is a valve metal electrode having on its surface an insulating oxide layer. The capacitance section is impregnated with an electrolyte comprising a solvent and an ionogen. The ionogen is a mixture of boric acid and pentanediol where in the mol ratio of boric acid to the pentanediol is between about 0.2-2. In a preferred embodiment the pentanediol is 2-methyl-2,4-pentanediol.

In another preferred embodiment the ionogen includes an equimolar proportion of a radical selected from the group consisting of an ammonium, a quaternary ammonium, an alkali metal, and a $C_1$-$C_{18}$ hydrocarbyl amine radicals.

When the solvent of the electrolyte of the present invention is a member of the group consisting of dimethylformamide, dimethylacetamide and dimethylpropionamide, the electrolyte may advantageously include equimolar proportions of a $C_1$-$C_{10}$ aliphatic acid and an organic amine. The aliphatic acid is preferred to be present in from 0.4—8 percent by weight of the electrolyte solution and the amine is preferably present in from 0.8—3.4 percent by weight of the solution.

BRIEF DESCRIPTION OF THE DRAWING

The drawing shows a capacitance section 10 in partly unrolled condition. Anode 11 is of a valve metal having on its surface an insulating oxide layer. Cathode 12 may also be a valve metal or of another metal, such as silver. Electrolyte absorbent films 13 and 14 e.g. of Kraft paper, are positioned between the anode and the cathode. Tabs 15 and 16 e.g. of aluminum, are connected to electrodes 11 and 12 respectively to function as terminals for the capacitance section. The electrolyte of the present invention is not shown in the drawing but in use completely impregnates the capacitance section.

EXAMPLE I

An electrolyte was prepared from 83.2 parts by weight of dimethylformamide, 8.5 parts by weight of 2-methyl-2,4-pentanediol and 8.3 parts by weight of boric acid. The electrolyte was separated into five equal parts and placed in glass beakers. Strips of plain, 3 mil thick, 99.99 percent aluminum foil were placed in the electrolyte so that 17.6 sq. cms. were submerged. Separate aluminum cathodes were placed in the beakers to complete the cells. Employing a current density of 1.5 milliamperes per square centimeter, oxide formation proceeded until the voltage across the cells reach a maximum of about 550 volts, at which point scintillation was observed. The resistivity of this electrolyte was about 1700 ohm-cm.

Under identical conditions but employing equimolar amounts of 2,3-naphthalenediol instead of the pentanediol, scintillation was observed at about 160 volts. Two groups of 12 aluminum capacitance sections of conventional design (see drawing) were impregnated with the foregoing electrolytes, i.e. one group contained the pentanediol type electrolyte and the other the naphthalenediol type electrolyte. The capacitors possessed a rating of 5 microfarads, 450 volts DC. These units were aged for 4 hours at 85° C. with 500 volts applied across a series combination of the capacitor and a 50 K. ohm resistor. The voltage across the naphthalenediol units did not increase beyond about 160 volts, whereas the pentanediol units increased to about 500 volts. This clearly demonstrates the considerable superiority of capacitors employing an electrolyte of this type.

EXAMPLE II

The following example illustrates the effect of adding a relatively small proportion of an aromatic diol to the electrolyte of Example I.

An electrolyte was prepared from 83.97 parts by weight dimethylformamide, 7.9 parts by weight 2-methyl-2,4-pentanediol, 0.83 parts by weight 2,3-naphthalenediol and 8.3 parts by weight boric acid. At makeup this system has a resistivity at 25° C. of about 15,000 ohm-cm. but after heating for 16 hrs. at 85° C. it has a resistivity at 25° C. of about 1200. After about a week of such heating or after several months of storage at room temperature, the resistivity levels off at around 600 ohm-cm.

Two groups of 12 aluminum capacitance sections were evaluated—one group was impregnated with the foregoing electrolyte and the other with an electrolyte of 88.9 parts by weight dimethylformamide, 8.3 parts by weight boric acid and 11.1 parts by weight of 2,3-naphthalenediol. The capacitors had a rating of 10 microfarads, 300 volts DC. These units were aged for 4 hours at 125° C. with 350 volts applied across a series combination of the capacitor and a 50 K. ohm resistor. The voltage across the naphthalenediol units did not increase beyond about 160 volts, whereas the pentanediol units increased to about 350 volts.

By using a mixture of 2-methyl-2,4-pentanediol and 2,3-naphthalenediol in suitable proportions, a range of electrolyte systems is possible for use at voltages between 160 and 550 volts wherein the resistivity may be chosen as the minimum possible for use at the particular voltage desired.

In preparing electrolytes of the present invention wherein the solvent is dimethylformamide, dimethylacetamide, dimethylpropionamide or the like, some time after the formation of the borodiolate, which is the major or primary reaction product, a secondary reaction involving part of the solvent takes place. The water byproduct of the primary reaction is believed to hydrolyze some of the amide to the corresponding aliphatic acid and amine. This secondary reaction is quite slow; and it leads to an undesirable gradual decrease in the resistivity of the electrolyte and a corresponding decrease in the dissipation factor of a capacitor containing this electrolyte. In the case of employing dimethylformamide and the reaction products of 2-methyl-2,4-pentanediol and boric acid, equilibrium is reached in about 140 hours when the electrolyte is maintained at 105° C. The resistivity of the electrolyte as initially formed is about 90,000 ohm-cm. After equilibrium the resistivity is about 1250 ohm-cm.

It has been determined that by adding a $C_1$-$C_{10}$ aliphatic acid, such as, formic, acetic, propionic, hexanoic, octanoic, etc. acid and any soluble amine, such as, triethylamine, n-propylamine, di-n-propylamine, di-iso-propylamine, tributylamine, aniline, etc., to this class of electrolytes of the present invention, the resulting system will have stable resistivity characteristics which are essentially the same as those of the unmodified electrolyte after equilibrium has been reached. This is illustrated by the following example.

EXAMPLE III

As indicated above, the pentanediol electrolyte of Example I had a resistivity of about 90,000 ohm-cm. as initially prepared. After maintaining this electrolyte at 105° C. for about 140 hours, the resistivity decreased to 1700 ohm-cm. A capacitor containing this electrolyte exhibited a dissipation factor which decreased from 200 percent to 7.4 percent under the same conditions.

Modifying the starting materials of the electrolyte by adding 0.6 parts by weight formic acid and 1.2 parts by weight di-n-propylamine; and by making an equivalent reduction in the amount of 2-methyl-2,4-pentanediol and boric acid, a comparatively stable electrolyte resulted. The resistivity of this electrolyte 30 minutes after preparation was 1760 ohm-cm. After being held at 105° C. for about 140 hours the resistivity was 1680 ohm-cm. The dissipation factor of a capacitor containing the same, remained comparatively stable.

While Example I illustrates the use of 2-methyl-2,4-pentanediol, it is to be understood that other related diol compounds can be employed. For example, 1,3-propanediol, 2,4-pentanediol; 2-ethyl-2,4-pentanediol; etc. There is nothing particularly critical about the amount of solute present in the electrolyte and one skilled in the art can readily determine optimum proportions for each particular electrolyte.

If the primary reaction product in the electrolyte of Example I be considered an ionized salt wherein the cation is hydrogen, then it is to be understood that other cation-supplying compounds can be employed in the preparation of the electrolytes of the present invention. Thus, equimolar proportions of compounds which supply an alkali metal, an ammonium, a quaternary ammonium or a $C_1$-$C_{18}$ hydrocarbyl amine cation can be employed. Examples of such compounds are sodium hydroxide, ammonium hydroxide, tetramethylammonium hydroxide and di-iso-propylamine. Additional examples of appropriate compounds are recited in the Ross et al. and Santway et al. patents referenced supra.

When the electrolyte of the present invention is to include an aromatic diol as a part thereof, the aromatic diol should be present within the range of about 0.5—5.0 mol percent. The aromatic diol can be any of the vicinal aromatic diols of the referenced patents.

When stabilizing the electrolyte of the present invention by the addition thereto of a $C_1$-$C_{10}$ aliphatic acid and an organic amine, each of these compounds should be added within the range of from 10 to 50 mol percent of the boric acid.

The electrolyte systems contemplated herein are not limited to those wherein the solvent is an amide, e.g. N,N-dimethylformamide, etc. since other solvents such as ethylene cyanohydrin, 3-methoxy-propionitrile, 1-methyl,2-pyrrolidone, ethyl Cellosolve, formamide, the Cellosolves broadly and mixtures thereof may also be employed. It is also to be understood that the electrolytes of the present invention have utility in capacitors other than aluminum capacitors, e.g. tantalum, niobium, etc.

Since it is obvious that many changes and modifications can be made in the above-described details without departing from the nature and spirit of the invention it is to be understood that the invention is not limited to said details except as set forth in the appended claims.

What we claim is:

1. An electrolytic capacitor comprising a capacitance section having a plurality of electrodes, at least one electrode being a valve metal having on its surface an insulating oxide layer, said section being impregnated with an electrolyte comprising a solvent and an ionogen of a mixture of boric acid and a pentanediol, wherein the mol ratio of boric acid to said pentanediol is between about 0.2–2.

2. The capacitor of claim 1 wherein said pentanediol is 2-methyl-2,4-pentanediol.

3. The capacitor of claim 1 wherein said ionogen includes an equimolar proportion of a radical selected from the group consisting of alkali metal, ammonium, quaternary ammonium and $C_1$-$C_{18}$ hydrocarbyl amine radicals.

4. The capacitor of claim 2 wherein said ionogen includes an equimolar proportion of a radical selected from the group consisting of alkali metal, ammonium, quaternary ammonium and $C_1$-$C_{18}$ hydrocarbyl amine radicals.

5. The capacitor of claim 1 wherein said solvent is a member of the group consisting of dimethylformamide, dimethylacetamide and dimethylpropionamide; and wherein said electrolyte includes equimolar proportions of a $C_1$-$C_{10}$ aliphatic acid and an organic amine.

6. The capacitor of claim 5 wherein said pentanediol is 2-methyl-2,4-pentanediol.

7. The capacitor of claim 5 wherein said ionogen includes an equimolar proportion of a radical selected from the group consisting of alkali metal, ammonium, quaternary ammonium and $C_1$-$C_{18}$ hydrocarbyl amine radicals.

8. The capacitor of claim 6 wherein said ionogen includes an equimolar proportion of a radical selected from the group consisting of alkali metal, ammonium, quaternary ammonium and $C_1$-$C_{18}$ hydrocarbyl amine radicals.

9. The capacitor of claim 1 wherein said ionogen includes from 0.5—5.0 mol percent of a vicinal aromatic diol and the pentanediol proportion is correspondingly reduced.

10. The capacitor of claim 9 wherein said pentanediol is 2-methyl-2,4-pentanediol and said aromatic diol is 2,3-naphthalenediol.

11. The capacitor of claim 9 wherein said solvent is a member of the group consisting of dimethylformamide, dimethylacetamide and dimethylpropionamide; and wherein said electrolyte includes equimolar proportions of a $C_1$-$C_{10}$ aliphatic acid and an organic amine.

12. The capacitor of claim 9 wherein said ionogen includes an equimolar proportion of a radical selected from the group consisting of alkali metal, ammonium, quaternary ammonium and $C_1$-$C_{18}$ hydrocarbyl amine radicals.

13. The capacitor of claim 9 wherein said solvent is a member of the group consisting of dimethylformamide, dimethylacetamide and dimethylpropionamide; and wherein said electrolyte includes equimolar proportions of a $C_1$-$C_{10}$ aliphatic acid and an organic amine.

14. The capacitor of claim 13 wherein said pentanediol is 2-methyl-2,4-pentanediol and said aromatic diol is 2,3-naphthalenediol.